(12) United States Patent
Srivastav et al.

(10) Patent No.: US 9,354,077 B2
(45) Date of Patent: May 31, 2016

(54) NAVIGATION SYSTEM

(75) Inventors: Amit Srivastav, Bangalore Karnataka (IN); Raghu Raman, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 754 days.

(21) Appl. No.: 12/123,831

(22) Filed: May 20, 2008

(65) Prior Publication Data

US 2009/0291418 A1 Nov. 26, 2009

(51) Int. Cl.
| G01C 21/00 | (2006.01) |
| G01C 23/00 | (2006.01) |
| G01C 21/26 | (2006.01) |

(52) U.S. Cl.
CPC ............... *G01C 23/00* (2013.01); *G01C 21/00* (2013.01); *G01C 21/26* (2013.01)

(58) Field of Classification Search
None
See application file for complete search history.

(56) References Cited

U.S. PATENT DOCUMENTS

| 4,642,775 A | 2/1987 | Cline et al. |
| 4,827,419 A | 5/1989 | Selby, III |
| 5,140,532 A * | 8/1992 | Beckwith et al. ............... 358/1.1 |
| 5,420,582 A | 5/1995 | Kubbat et al. |
| 5,715,163 A | 2/1998 | Bang et al. |
| 5,802,492 A | 9/1998 | DeLorme et al. |
| 5,904,724 A | 5/1999 | Margolin |
| 5,936,552 A * | 8/1999 | Wichgers et al. ............... 340/963 |
| 6,077,077 A | 6/2000 | Geipe |
| 6,112,241 A | 8/2000 | Abdelnour et al. |
| 6,134,500 A | 10/2000 | Tang et al. |
| 6,289,277 B1 | 9/2001 | Feyereisen et al. |
| 6,307,572 B1 | 10/2001 | DeMarcken et al. |
| 6,311,107 B1 | 10/2001 | Curto et al. |
| 6,321,158 B1 | 11/2001 | DeLorme et al. |
| 6,335,694 B1 | 1/2002 | Beksa et al. |
| 6,353,794 B1 | 3/2002 | Davis et al. |
| 6,389,355 B1 | 5/2002 | Gibbs et al. |
| 6,421,603 B1 | 7/2002 | Pratt et al. |
| 6,486,799 B1 | 11/2002 | Still et al. |
| 6,522,958 B1 | 2/2003 | Dwyer et al. |
| 6,678,588 B2 | 1/2004 | He |
| 7,027,898 B1 | 4/2006 | Leger et al. |
| 7,095,423 B2 | 8/2006 | Cosman et al. |

(Continued)

FOREIGN PATENT DOCUMENTS

| EP | 2056273 A1 | 5/2009 |
| EP | 2136276 A2 | 12/2009 |

(Continued)

OTHER PUBLICATIONS

Srivastav, A. et al.; Systems and methods for providing a vehicle movement path simulation over a network; filed with the USPTO on Feb. 21, 2011 and assigned U.S. Appl. No. 13/031,528.

(Continued)

*Primary Examiner* — Ryan Zeender
*Assistant Examiner* — Christopher Buchanan
(74) *Attorney, Agent, or Firm* — Ingrassia Fisher & Lorenz, P.C.

(57) ABSTRACT

A system and method are disclosed that permits a user to interactively and graphically design a company route to be traveled by a vehicle such as an airplane. Alternatively or additionally, a system and method are disclosed that permits a user to interactively and graphically conduct a virtual travel through, such a virtual fly through, a company route to be traveled by a vehicle such as an airplane.

1 Claim, 9 Drawing Sheets

(56) References Cited

U.S. PATENT DOCUMENTS

| | | | |
|---|---|---|---|
| 7,142,977 B2 * | 11/2006 | Knuuttila et al. | 701/117 |
| 7,158,136 B2 * | 1/2007 | Gannon | 345/440 |
| 7,162,335 B2 | 1/2007 | He et al. | |
| 7,363,420 B2 | 4/2008 | Lin et al. | |
| 7,640,098 B2 | 12/2009 | Stenbock et al. | |
| 2002/0072414 A1 | 6/2002 | Stylinski et al. | |
| 2002/0188776 A1 | 12/2002 | Houlberg | |
| 2003/0151633 A1 | 8/2003 | George et al. | |
| 2003/0187819 A1 | 10/2003 | Gutierrez et al. | |
| 2004/0017385 A1 | 1/2004 | Cosman et al. | |
| 2005/0264529 A1 * | 12/2005 | Morgan et al. | 345/160 |
| 2006/0031006 A1 | 2/2006 | Stenbock et al. | |
| 2006/0217853 A1 * | 9/2006 | Servantie et al. | 701/4 |
| 2007/0100515 A1 | 5/2007 | McClure | |
| 2007/0184821 A1 | 8/2007 | McUmber et al. | |
| 2007/0271079 A1 | 11/2007 | Oguchi et al. | |
| 2008/0195309 A1 * | 8/2008 | Prinzel, III et al. | 701/208 |
| 2009/0076721 A1 | 3/2009 | Coulmeau et al. | |
| 2009/0105935 A1 | 4/2009 | Jha et al. | |
| 2009/0210109 A1 | 8/2009 | Ravenscroft | |
| 2009/0291418 A1 | 11/2009 | Srivastav et al. | |
| 2010/0114633 A1 | 5/2010 | Sislak et al. | |
| 2010/0145552 A1 | 6/2010 | Herman et al. | |
| 2010/0160013 A1 | 6/2010 | Sanders | |
| 2010/0191458 A1 | 7/2010 | Baker et al. | |

FOREIGN PATENT DOCUMENTS

| | | |
|---|---|---|
| EP | 2189755 A1 | 5/2010 |
| WO | 0106476 A2 | 1/2001 |
| WO | 03005326 A1 | 1/2003 |
| WO | WO 2005/057133 | 6/2005 |
| WO | 2011132002 A2 | 10/2011 |

OTHER PUBLICATIONS

Srivastav, A. et al.; Systems and methods for obtaining selected portions of a movement path simulation over a network; filed with the USPTO on Feb. 25, 2011 and assigned U.S. Appl. No. 13/035,508.
USPTO Office Action for U.S. Appl. No. 13/031,528 dated Mar. 13, 2013.
USPTO Office Action, Notification Date Nov. 13, 2012; U.S. Appl. No. 13/035,508.
USPTO Office Action, Notification Date Jul. 5, 2012; U.S. Appl. No. 13/035,508.
USPTO Office Action for U.S. Appl. No. 13/031,528 dated Feb. 8, 2013.
USPTO Office Action, Notification Date Mar. 26, 2013; U.S. Appl. No. 13/035,508.
EP Search Report for application No. 12 156 276.3 dated Nov. 22, 2013.
EP Search Report, EP 12156613.7-1803/2492891 dated Nov. 28, 2013.
EP Exam Report, EP 12156613.7-1803 dated Jan. 13, 2014.
USPTO Office Action, Notification Date Apr. 24, 2014; U.S. Appl. No. 13/035,508.
USPTO Office Action, Notification Date Aug. 5, 2013; U.S. Appl. No. 13/035,508.
USPTO Final Office Action, Notification Date Oct. 22, 2014; U.S. Appl. No. 13/035,508.
USPTO Decision on Appeal 2014-00585; U.S. Appl. No. 13/031,528, dated Dec. 15, 2015.

* cited by examiner

NAVIGATION SYSTEM

TECHNICAL FIELD

The technical field of the system disclosed herein relates to navigation, particularly navigation of aircraft, although the system disclosed herein could relate to the navigation of any craft.

BACKGROUND

A company route is defined by a list of records that include airports, procedures, airways, and/or waypoints satisfying regulatory authorities regarding the flight of an aircraft. Essentially, a company route is a description of the flight path to be followed by an aircraft as it flies between origin and destination airports. This flight path is designed specifically to fit the requirements of airline operators who operate between origin and destination points.

A company route is typically designed on the ground by navigation personnel, who receive the requirements from the airline operators. The navigation personnel use a list of waypoints between origin and destination airports along the flight path as inputs so as to produce the company route. The design of a company route is a mostly manual process and it is certainly time-consuming. As a result, the process is error prone. Also, the design process is textually oriented, which makes it difficult for the navigation personnel to visualize the actual company route, which is made even more difficult because, during this design process, the designer has no idea about the terrain and obstacles which may present along the designed company route.

As can be seen, the step by step process that is necessary to create a company route is complex. The source airport, the departure, runway transitions, common transitions, en-route transitions, waypoint fixes, airways, arrival transitions, approach transitions, and the actual approach all/few need to be selected and specified based on defined criteria and stringed together in a way that forms the record of the company route. At each selection point, the navigation personnel use multiple sources (charts, Aeronautical Information Packages (AIPs), etc.) to select the desired points of interest. Because so many sources are needed to provide the information required for designing a company route, there is a distinct possibility of making mistakes, and the designer will not have any leverage to view the sources together. Also, during this whole process, the designer has no idea about the terrain and obstacles which may be present along the designed route. Moreover, text based route design provides little means to select an optimal path.

Therefore, there is a need for an interactive and graphical navigation system that interactively provides navigation personnel with a graphical view of a company route as it is being designed, along with additional information such as information about terrain, obstacles, airports, airways, etc. This system can be used by navigation personnel on the ground and can be arranged to empower them to be more aware of the choices of the route at a particular fix (a real time view of the route on a world map backdrop if a choice is selected), to compare different choices so that they can make better decisions quicker, to be aware of terrain and obstacle information, and to verify the company route by viewing a virtual fly through of the route.

The relevant choices (e.g., fixes, airways, procedures, etc.) relative to a particular fix can be shown graphically, and the user can make selections based on the graphics so as to construct the company route. This company route can then be verified by virtually flying through the coded route with underlaid terrain and obstacles.

BRIEF DESCRIPTION OF THE DRAWINGS

Features, aspects, and advantages of the present invention will become better understood when the following detailed description is read with reference to the accompanying drawings in which.

DETAILED DESCRIPTION

As discussed above, a company route is a sequence of flight segments, which define a path from an origin to a destination. A company route origin is a fix (in this case typically an airport) that represents the starting point of the company route. A company route destination is a fix (in this case also typically an airport) that represents the final or destination point of the company route. Other fixes which may be part of a company route are navaids, ndbs and waypoints. A navaid is any visual or electronic device airborne or on the surface which provides point-to-point guidance information or position data to aircraft in flight. Ndbs are non-directional beacons. A waypoint is a set of coordinates that is typically given as longitude, latitude, and altitude.

The company route data contains information about the legs of the company route. This information specifies the details of each flight segment of a company route commonly known as "VIA". Each VIA can be an alternate airport, an approach, an airway, a direct path to a fix, an initial fix, a SID (Standard Instrument Departure), or a STAR (Standard Terminal Arrival Route).

Figure 1:
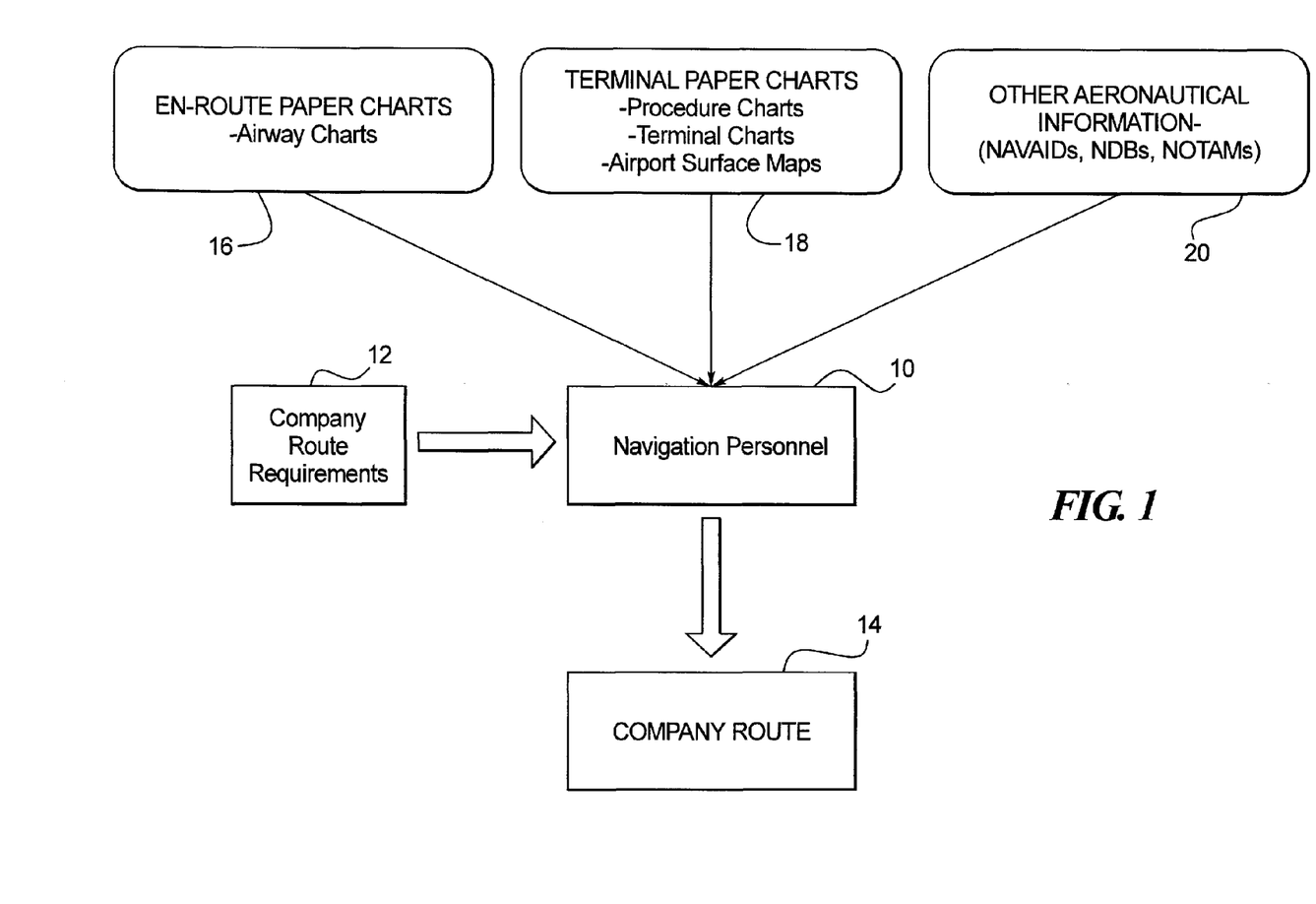
FIG. 1 illustrates a conventional manual process of creating and verifying company routes by navigation personnel.

FIG. 1 shows the conventional process of creating and verifying company routes by the navigation personnel. Navigation personnel 10 rely on company route requirements 12 to produce a company route 14. The designing process is complicated for the navigation personnel 10 since the process involves references to charts and other aeronautical information. For example, the navigation personnel 10 use en-route paper charts 16, terminal paper charts 18, and other aeronautical information paper charts 20 as inputs to their design process. The navigation personnel 10 refer to the applicable en-route paper charts 16, terminal paper charts 18, and other aeronautical information paper charts 20 in creating the company route 14 based on the pre-defined company route requirements 12.

This process of creating the company route 14 is manual and time consuming, and may lead to errors. Moreover, design and verification of the company route 14 are not integrated by the process. Verification of the company route 14 as currently performed is tedious and drawn out because it involves manually looking at the coded company route data in text format to check for the correctness of the company route 14.

Additionally, the current en-route paper charts 16, the terminal paper charts 18, and the other aeronautical information paper charts 20 are very cluttered, especially the en-route paper charts 16, which makes it very tedious for the navigation personnel 10 to expediently select the required airway segments. Further, there is no mechanism to display the company route 14 graphically during the construction process, making the design process even more difficult.

Figure 2:
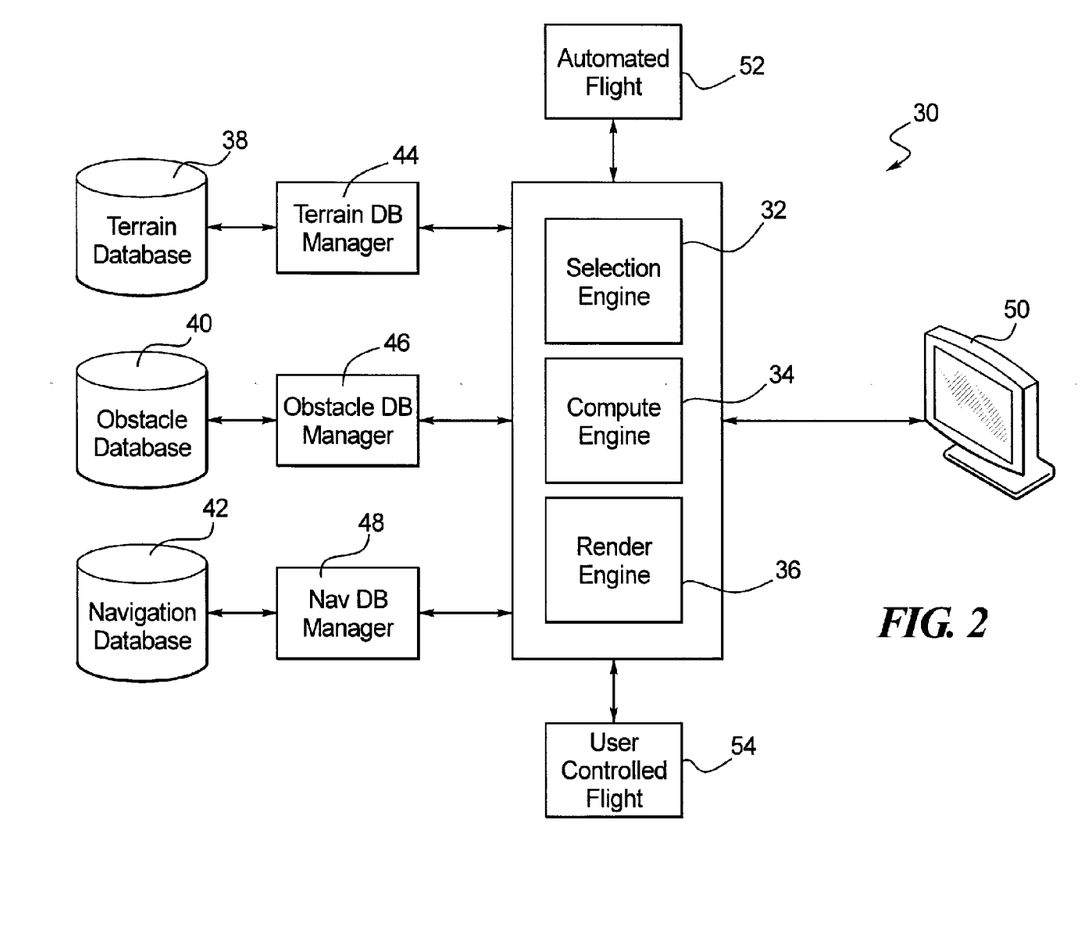
FIG. 2 illustrates a computer system that overcomes one or more of the problems associated with the current manual process of FIG. 1.

FIG. 2 illustrates a computer system 30 that overcomes one or more of the problems associated with the current manual process of designing and/or verifying company routes. The computer system 30 includes a computer 31 that includes a selection engine 32, a compute engine 34, a render engine 36. The computer system 30 further includes a terrain database 38, an obstacle database 40, and a navigation database 42. The terrain database 38 interfaces with the selection engine 32 through a terrain database manager 44, the obstacle database 40 interfaces with the selection engine 32 through an obstacle database manager 46, and the navigation database 42 interfaces with the selection engine 32 through a navigation database manager 48. The render engine 36 communicates with a monitor 50 so that the design and/or verification of the company route 14 may be displayed graphically. The compute engine makes computations as needed.

An automated flight block 52 can be used by the user to fly through the coded company route once the company route has been designed. During automated flight, the user cannot change any dynamic parameters such as aircraft velocity, pitch, roll and yaw. The user can only stop the flight at the desired location. However, an user controlled flight block 54 allows the user to assume manual control of these dynamic parameters.

Figure 3:
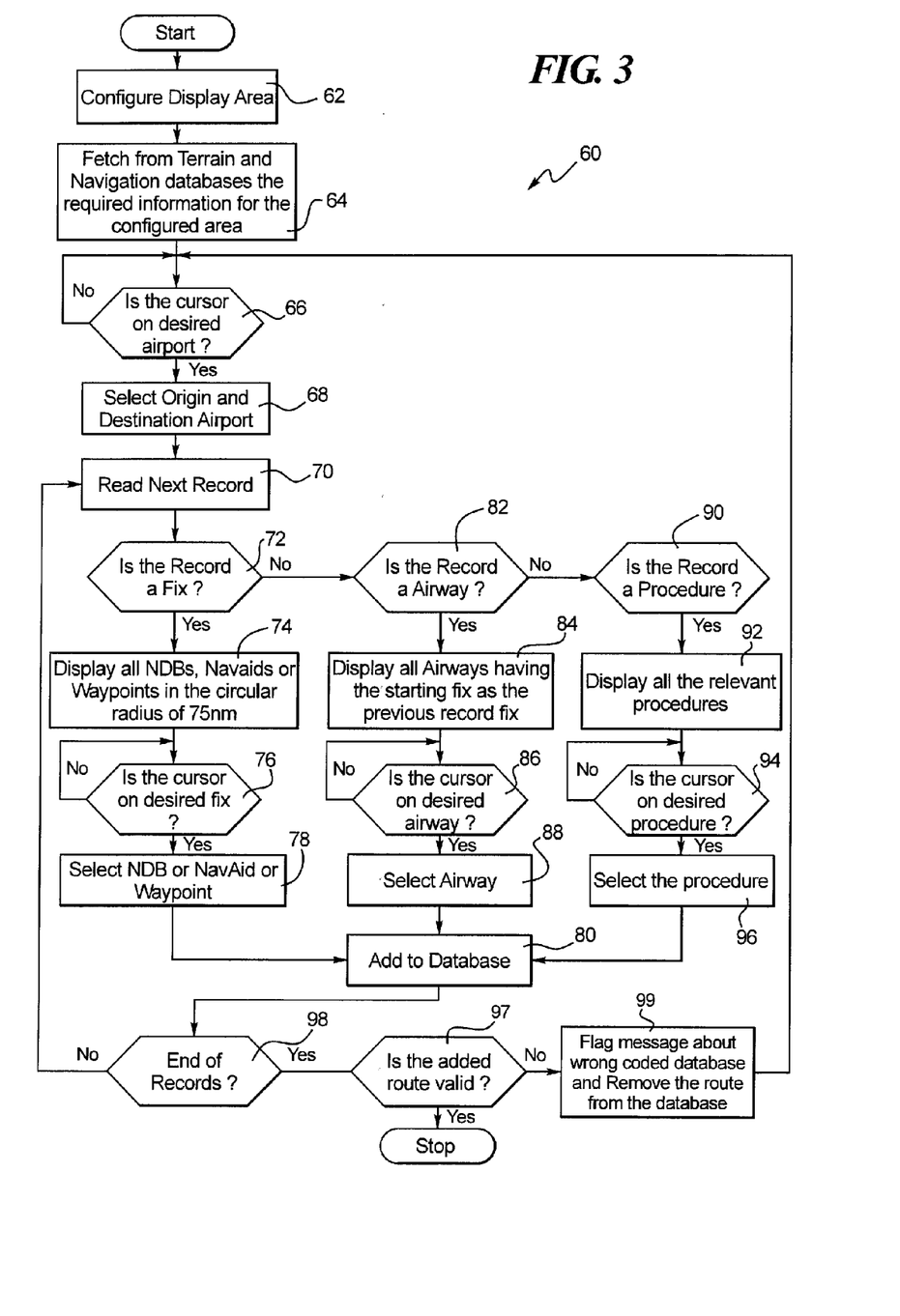
FIG. 3 is a flow chart illustrating a program that can be executed by the computer system of FIG. 2 so as to build a company route.

The computer system 30 can be used by the navigation personnel 10 to encode the company route 14 in an interactive manner (shown, for example, by way of the flow chart of FIG. 3). Additionally or alternatively, the computer system 30 can be used by the navigation personnel 10 to verify the encoded company route 14 by performing a virtual fly through the encoded company route 14 (shown, for example, by way of the flow chart of FIG. 4). The design and/or verification process shown by way of example in FIGS. 3 and 4 can be performed by desktop applications executing on the computer system 30.

The flow chart of FIG. 3 is an example of a route building process 60 that can be executed by the computer system 30 and that eases the encoding of the company route 14, thereby lessening the burden on the navigation personnel 10. The route building process 60 begins with the configuration of a map display area at 62. The navigation personnel 10 can use this configured map display area to code the company route 14. This configured map display area is displayed on the monitor 50.

The map display area is the area which the user configures by setting the latitude and longitude position of the rectangular bounding box and the range. This view may be constructed both in 2D and 3D. The map display area is computed based on the current position (latitude and longitude) as specified by the user and the distance up to which the user wants the simulated view to be constructed. Based on these two inputs, a 2D rectangular view and a 3D view volume will be constructed programmatically.

Required information for the configured map display area is fetched from the terrain database 38, from the obstacle database 40, and from the navigation database 42 at 64. For example, the required information fetched at 64 can include all of the airports within the map display area configured at 62. Also, terrain, obstacle and navigation data, and all airports, navaids, ndbs, and waypoints in the configured map area/volume are fetched and displayed.

At 66, the computer system 30 determines whether the navigation personnel 10 has positioned a mouse cursor over any of the airports (fixes) displayed on the monitor 50 within the configured map area. If so, the navigation personnel 10 at 68 selects the origin and destination airports (fixes) for the company route 14 from among the fixes displayed on the monitor 50 within the configured map area such as by clicking on these origin and destination airports.

At this point, the navigation personnel 10 starts the coding of the company route, keeping the selected origin airport as the starting fix. Accordingly, the route building process 60 the navigation personnel 10 selects a next via (route) type in building the company route 14 at 70 selects in response to a suitable operation by the navigation personnel 10. This via type is in the form of a record, and this next record, for example, can be a fix, an airway, or a procedure. Depending on the selection of the next via type (whether a fix, an airway, or a procedure), required features will be rendered on the map area displayed on the monitor 50 by the route building process 60. A desired fix, airway, or procedure is interactively selected by suitable operation of the navigation personnel 10 and is added to the record of the company route 14. This route building process 60 continues to iterate until the navigation personnel 10 selects the destination record as the next record, at which point the record of the company route 14 is complete.

A procedure is a collection of fixes that create a coded path for flight departures and arrivals. It can be classified in three categories—SID (Standard Instrument Departure), STAR (Standard Terminal Arrival Route) and APPROACH. Generic example for a procedure (SID). The following chart is an example of such a procedure:

| AirportName | ProcedureIdent | Cycle | Rwy | Fix | PathTerminator |
|---|---|---|---|---|---|
| VHHH | ATEN2A | B | 07R | PORPA | CF |
| VHHH | ATEN2A | B | 07R | RAMEN | DF |
| VHHH | ATEN2A | B | 07R | COLEY | TF |
| VHHH | ATEN2A | B | 07R | ATENA | TF |
| VHHH | ATEN2A | B | 07R | BEKOL | TF |

Thus, if the next selected record is a fix as determined at 72, all non-directional (radio) beacons (NDBs), navigational aids (Navaids) such as ILS, and/or waypoints within proximity of the current fix (such as within a circular radius of 75 nautical miles of the current fix) are fetched from the navigation database manager 48 and are displayed on the monitor 50 at 74. When the navigation personnel 10 have just begun building the company route 14, the current fix is the origin, such as source airport, of the flight. At 76, the computer system 30 determines whether the navigation personnel 10 has positioned a mouse cursor over a desired one of the displayed NDBs, Navaids, or waypoints. The navigation personnel 10 at 78 selects the desired NDB, Navaid, or waypoint for building the company route 14. The route building process 60 adds this selected record for the company route 14 at 80 to the database corresponding to the company route 14.

Terrain and obstacle features can also be used by the route building process 60. For example, the route building process 60 can be arranged to provide a warning when the navigation personnel 10 makes a selection that conflicts with the terrain and obstacle features. Thus, the route building process can be made intelligent to perform dynamic/runtime analysis of the detection of terrain/obstacle presence on the path which is being coded by the navigational personnel.

If the next selected record is an airway as determined at 82, all airways having a starting fix as the current fix previously selected by the navigation personnel 10 are fetched from the navigation database manager 48 and are displayed on the monitor 50 at 84. For example, if the immediately previous fix selected by the navigation personnel 10 is the source or origin airport, such as when the navigation personnel 10 have just begun building the company route 14, then all airways that have this airport as their starting fix are displayed at 84. At 86, the computer system 30 determines whether the navigation personnel 10 has positioned a mouse cursor over a desired one of the displayed airways. The navigation personnel 10 at 88 selects the desired airway for building the company route 14. This selected record for the company route 14 is added at 80 to the database corresponding to the company route 14.

If the next selected record is a procedure as determined at 90, all relevant procedures are fetched from the navigation database manager 48 and are displayed on the monitor 50 at 92. At 94, the computer system 30 determines whether the navigation personnel 10 has positioned a mouse cursor over a desired one of the displayed procedures. The navigation personnel 10 at 96 selects the desired procedure for building the company route 14. This selected record for the company route 14 is added at 80 to the database corresponding to the company route 14.

A procedure helps in defining a departure path from the runway. It also helps in defining an arrival and approach path to the desired runway.

If the building of the company route 14 is not complete and there are more records to select in building the company route 14 as determined at 98, the route building process 60 returns to 70 to permit the navigation personnel 10 to select the next record. However, when the building of the company route 14 is complete and there are no more records to select in building the company route 14 as determined at 98, a check is made at 97 to determine whether the route is a valid route. In making this check, the route building process 60, for example, may determine one or more of the following: whether the client ID assigned to the route is blank, whether the route ID assigned to the route is blank, whether any fix ID is NULL, whether each fix has been correctly designated, whether the sequence number is blank or numeric, whether each VIA has been correctly designated, whether each transition is correct, and/or whether the altitude has been specified as a number or a flight level. Additional or alternative checks can be made. If the route is not valid, a flag message is issued at 99 and/or the route is deleted from the database. Program flow then returns to 66 to amend the current route or to build a new route. Once a route is determined to be valid at 97, the route building process 60 ends.

The user configures the map area by specifying North-East and South-West corner in terms of Latitude/Longitude. After the selection of the extreme corners, data will be processed by the selection engine 32 and passed to the compute engine 34. The compute engine 34 performs all mathematical calculations including calculating parameters such as range for the view and preparation of the viewing volume. Using the North-East and South-West Latitude/Longitude coordinates, the compute engine 34 fetches the terrain, obstacle and navigation data from the respective databases. These data will be refined and given to the render engine 36 to display on the computer screen. Instead of separate engines, the program 60 may be executed by a single engine.

The vehicle route data stored at 80, for example, may have a format consistent with ARINC 424/Navigation Data—Record layout/Company Route Records. Accordingly, this vehicle route data can include the following elements: record type, customer ID, origin of route, destination of route, route ID, record sequence number, type of route, sid/star/app/awy ID for type of route, "to fix," runway transition, enroute transition, cruise altitude, and cycle date. The record type, for example, may indicate whether the data in the record is standard data or data tailored by the user. The record sequence number defines the location of the record in the sequence defining the route of the flight identified by the route ID. The route type includes alternate airport, approach route, designated airway, direct to fix, initial fix, preferred route, route via fix, route via fix not permitted, standard instrument departure, standard instrument departure—enroute transition, standard instrument departure—runway transition, standard terminal arrival and profile descent, standard terminal arrival and profile descent—enroute transition, and standard terminal arrival and profile descent—runway transition. The sid/star/app/awy ID is the identification of the particular route to be flown as reference by the route type. The "to fix" data is a company route and preferred route "to fix" filed that is used to terminate the route referenced by the sid/star/app/awy ID, or to terminate a direct segment or to start an initial segment when no sid/star/app/awy ID is referenced.

Figure 4:
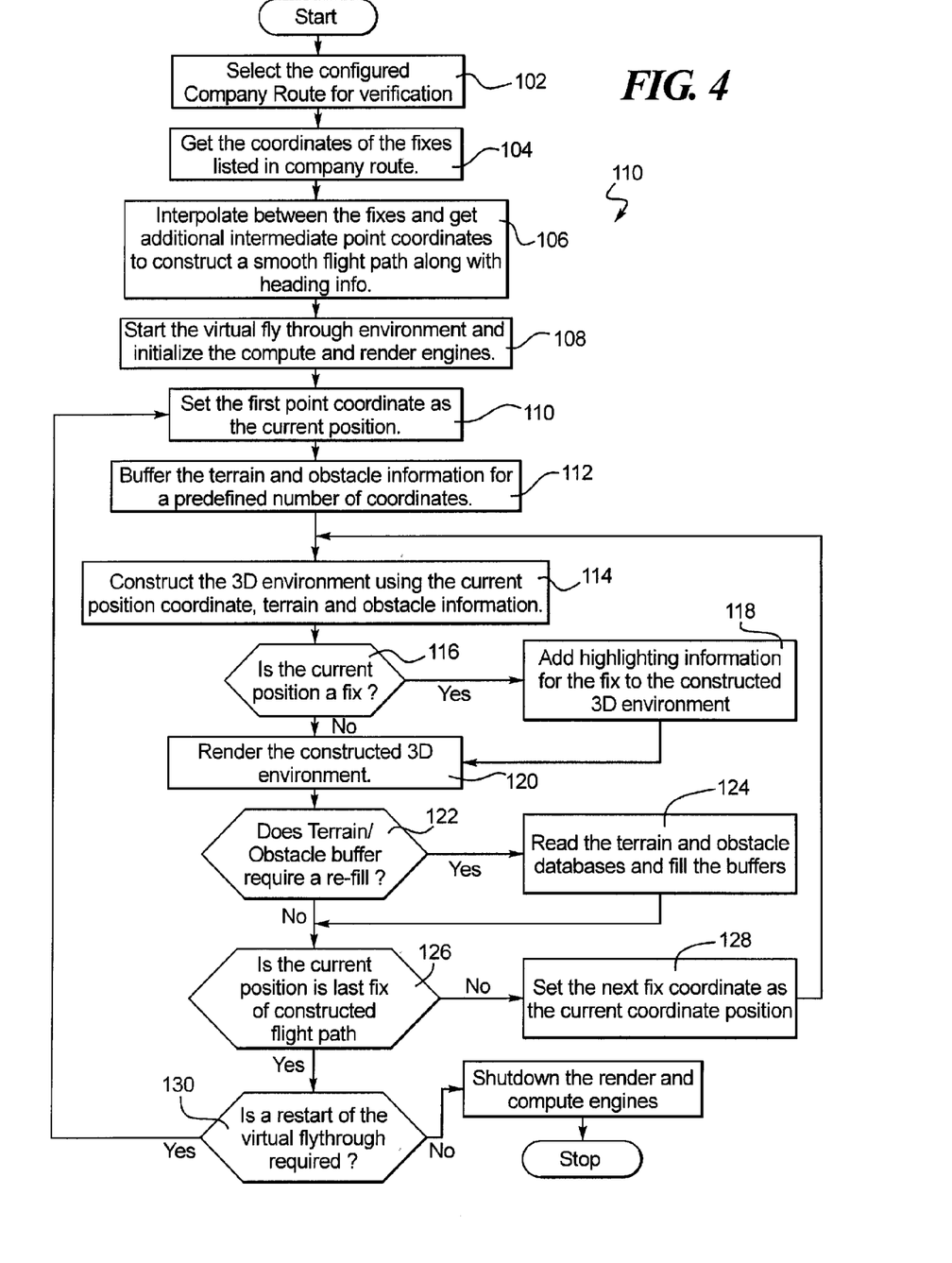
FIG. 4 is a flow chart illustrating a program that can be executed by the computer system of FIG. 2 so as to verify a company route; and, FIGS. 5-9 illustrate examples of screen displays rendered on the monitor of the computer system of FIG. 2 during execution of the programs of FIGS. 3 and 4.

The flow chart of FIG. 4 is an example of a verification process 100 that can be executed by the computer system 30 and that can be used by the navigation personnel 10 to verify the company route 14 such as when the company route 14 is encoded with use of the route building process 60. The verification process 100 flies the company route 14 virtually in order to check its validity and correctness. A three dimensional representation of the company route 14 provides a better understanding of the designed company route 14 and, therefore, reduces the workload on the navigation personnel 10. Also, a three dimensional representation of the terrain and obstacles below the company route 14 help to visualize its path position with respect to the terrain and obstacles. This visualization permits easier detection of potential conflicts between the company route 14 and the terrain and obstacles along the company route 14, and also allow the navigation personnel 10 to design the company route 14 around any hazardous areas.

Verification begins at 102 with the navigation personnel 10 selecting the company route 14 for verification. When the company route 14 is selected at 102, the coordinates of all fixes listed in the record of the company route 14 are fetched from the navigation database 42 at 104. At 106, the verification process 100 performs any interpolation between the fixes in order to determine additional coordinates and heading information that are required to smooth the flight path along the company route 14.

The virtual fly through the company route 14 is started at 108. At 110, the virtual fly through starts at the coordinates of the first fix, typically the airport from which the company route 14 originates. At 112, terrain and obstacle information within a predefined distance of the first fix coordinates are fetched from the terrain and obstacle databases 38 and 40 and are buffered by the computer system 30.

At 114, the computer system 30 constructs a three dimensional model of the terrain and obstacles corresponding to the terrain and obstacle information fetched at 112 based on the current fix coordinates set at 110. If the current position is a fix as determined as 116, highlighting information for the fix is added to the three dimensional model at 118. This highlighting information may include but not be limited to fix identifier, altitude of the fix (if present), and frequency of the fix in case the fix is a navaid or ndb. If the current position is not a fix as determined as 116, or after highlighting information for the fix has been added to the three dimensional model at 118, this three dimensional model is rendered and displayed by the monitor 50 at 120.

The designed route can be displayed in three dimensions. The flight path made up of fixes will be rendered in three dimensions which the user will view while validating the coded path or a demo fly of the coded path or company route. The flight path can be rendered on top of rendered terrain and obstacle data.

At 122, the computer system 30 determines whether it is necessary to refill the buffer with terrain and obstacle information corresponding to the current position along the flight path. If so, the buffer is refilled at 124 with terrain and obstacle information fetched from the terrain and obstacle databases 38 and 40. If not, or after the buffer is refilled with terrain and obstacle information fetched from the terrain and obstacle databases 38 and 40 at 124, the computer system 30 determines at 126 whether the current position of the virtual fly through is the last fix of the constructed flight path for the company route 14.

If not, the coordinates of the next fix along the company route 14 is set at 128 and program flow returns to 114 to add the appropriate information to the three dimensional model. If the current position of the virtual fly through is the last fix as determined at 126, the computer system 30 determines at 130 whether to restart the virtual fly through, i.e., whether the navigational personnel want to virtually fly the company route 14 again. If so, program flow returns to 110. If not, the execution of the verification process 100 ends.

Accordingly, the computer system 30, with the route building process 60 and/or the verification process 100, is capable of designing the company route 14 in an interactive and graphical way, such as by way of a two dimensional map. The designed company route 14 is verifiable by virtually flying the company route 14 in presence of actual terrain and obstacles. The computer system 30 displays all of the airports in the selected area. Origin and destination fixes are chosen by the navigation personnel 10, starting the route encoding process with the origin airport as the starting fix. The computer system 30 provides the navigation personnel 10 with the ability to specify the next via type (e.g., fix, airway, or procedure). Depending on this selection, required features are rendered on the map area. The navigation personnel 10 interactively selects the desired fix and adds it to the record of the company route 14. This process is followed until the navigation personnel 10 sets the next record as the destination record. At this point, the record is marked as completed record.

Figure 5:
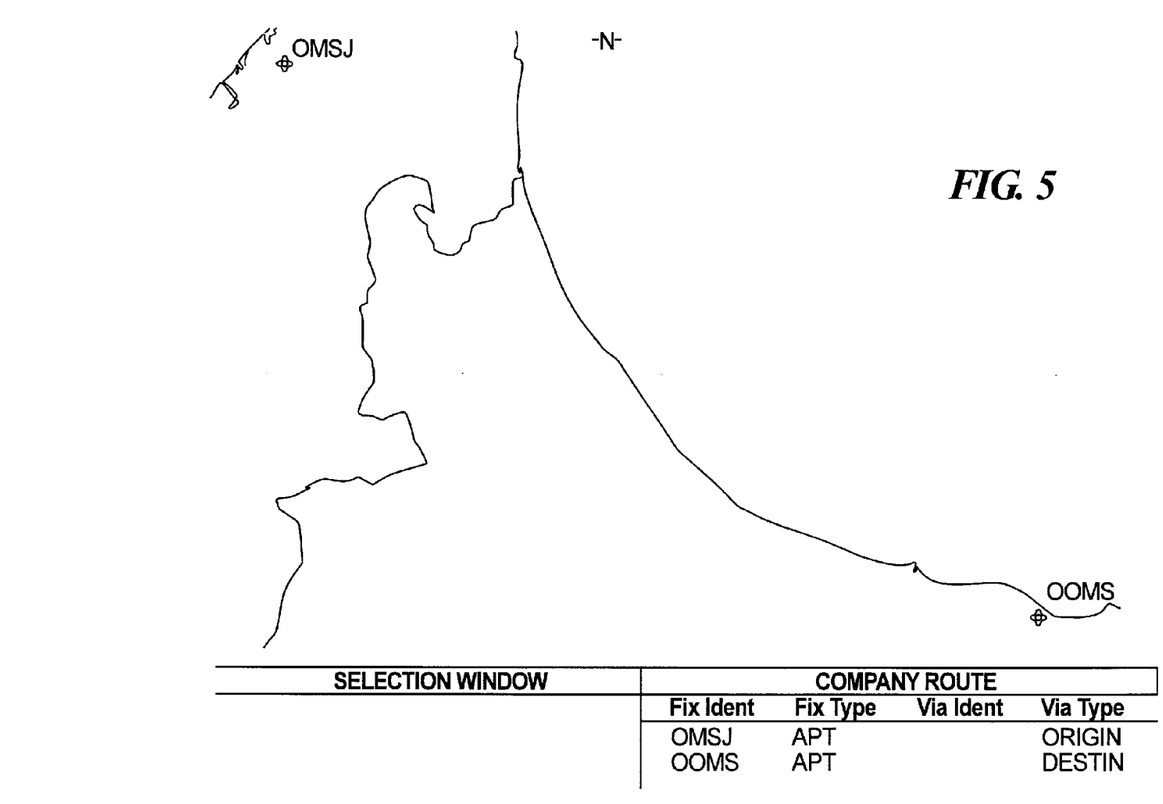

FIG. 5 shows by way of example a display on the monitor 50 of source and destination airports OMSJ and OOMS, respectively, for a company route, such as the company route 14, against the backdrop of a map selected by the navigation personnel 10. The beginnings of the population of the record of the company route 14 is shown in the bottom right of FIG. 5. This display gives the navigation personnel 10 a clear view of the positions of these airport positions and along with their identifiers.

Figure 6:
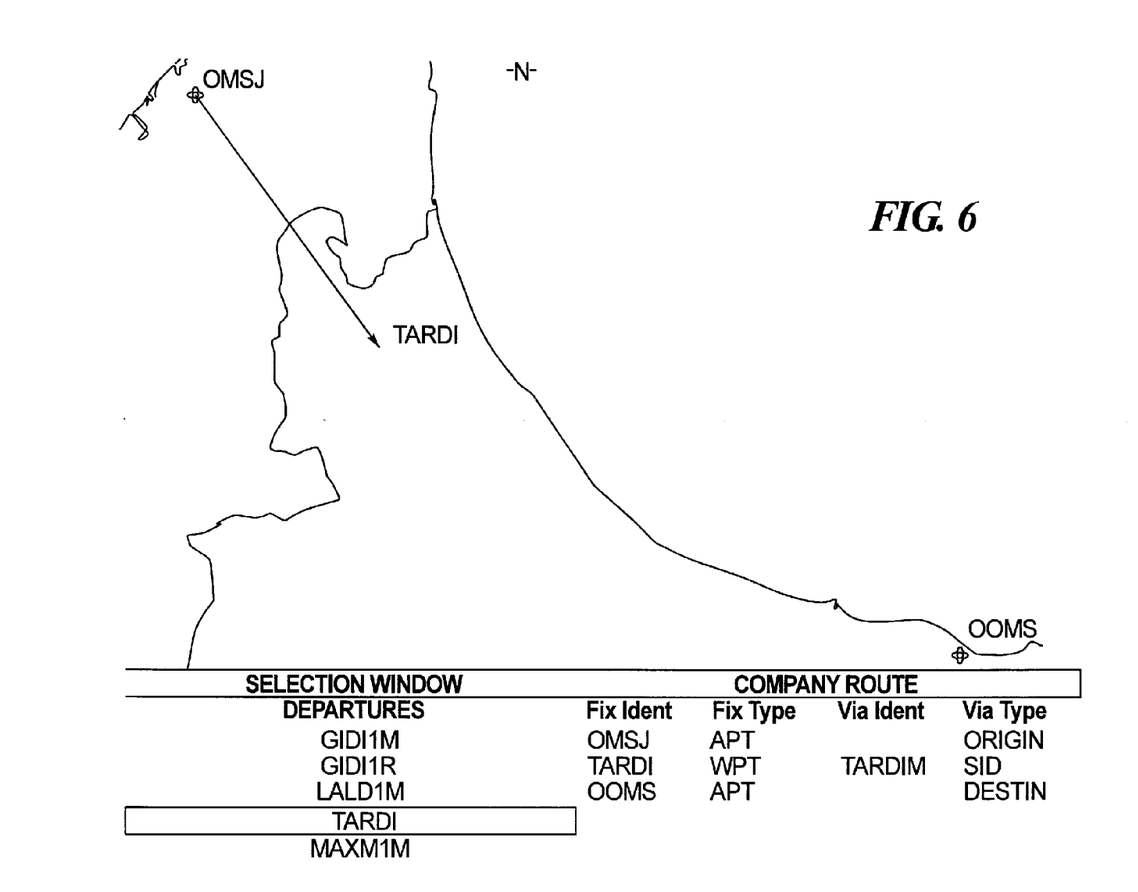

FIG. 6 shows that the navigation personnel 10 has specified the next via type as a SID such that all of the applicable Standard Instrument Departures are shown in the left side of the Selection Window. The navigation personnel 10 can select the required SID (TARDI) and add it to the company route 14. Once the SID is added, the Company Route Window is updated to include the final fix of the SID. FIG. 6 shows the step increment in the company route construction. The exact process may differ, for example, such as in the case where a procedure needs to be selected. In this latter case, the Selection Window would show the list of available procedures from which selections can be made.

Figure 7:
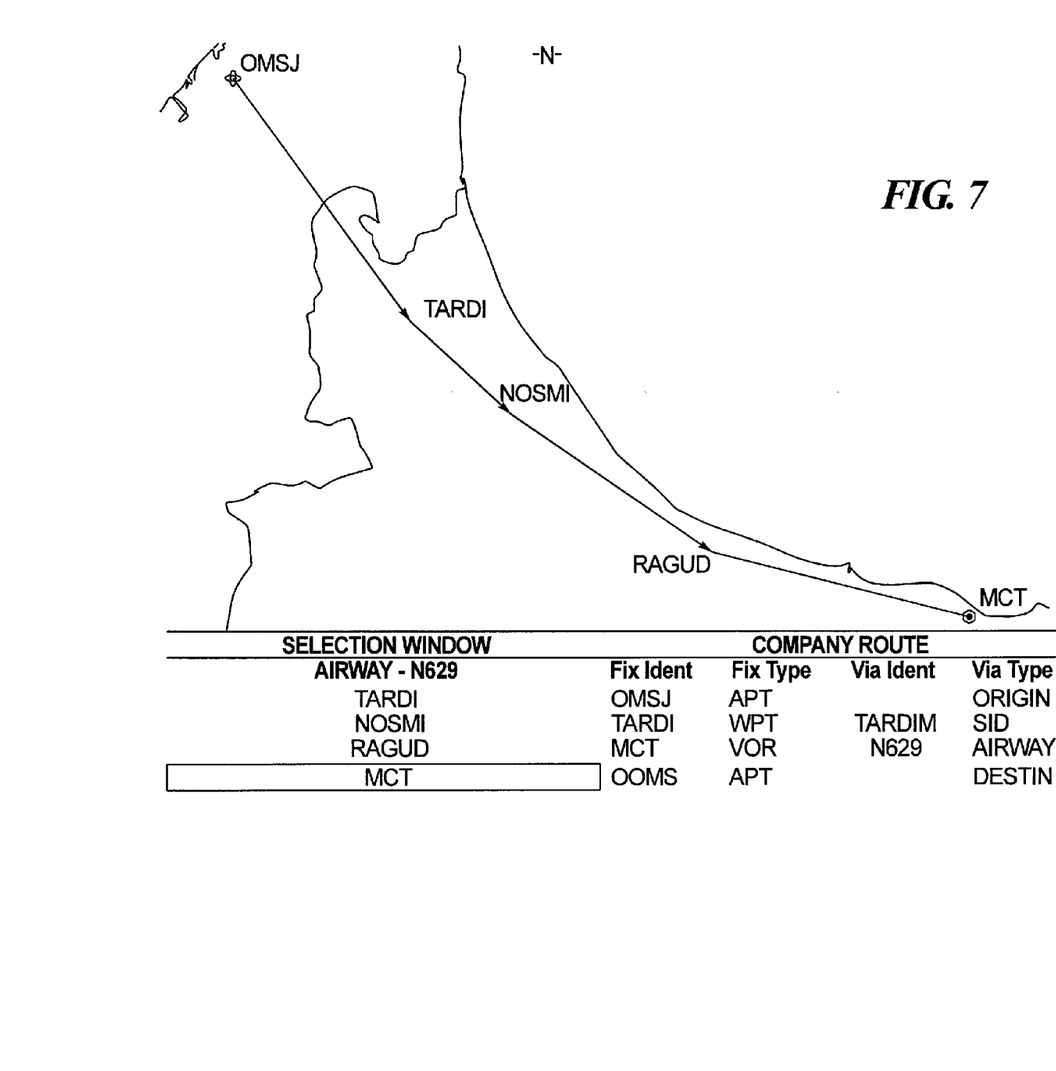

As shown in FIG. 7, the navigation personnel 10 has specified the next via type as an airway. All of the airways passing through the fix TARDI are displayed against the backdrop of the map. In this example, the navigation personnel 10 has selected airway N629 which starts from the fix TARDI. The list of fixes of the airway is shown in the Selection Window. The navigation personnel 10 chooses the fix MCT which is the end of the airway fix selection. Thereafter, the Company Route Window is updated to include the airway record as shown.

Figure 8:
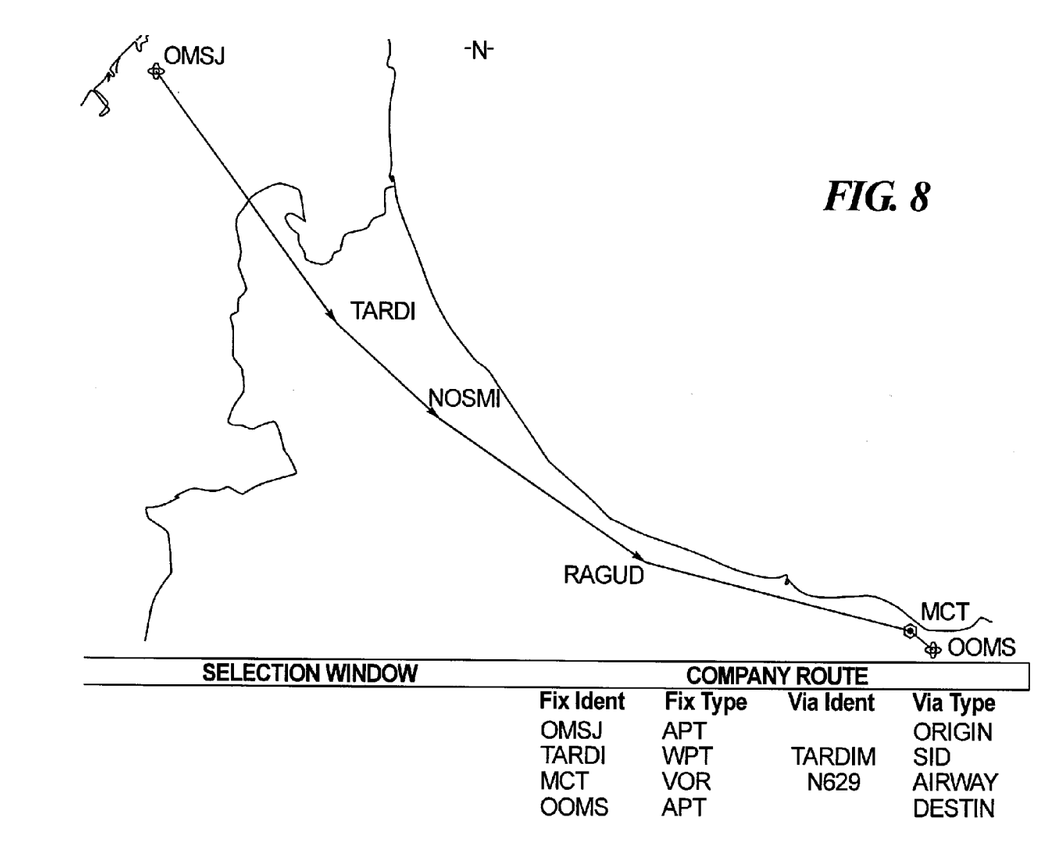

As shown in FIG. 8, the navigation personnel 10 has selected the next via type as the destination which is considered as the end of the record of the company route 14 (shown on the right bottom side). The graphical output is shown on the monitor 50 which allows the navigation personnel 10 to validate the constructed company route 14 both textually as well as graphically on the same screen. The screens may differ from those shown such as in case where the arrivals and approach need to be selected. The example shown in FIGS. 5-8 is a simple one to showcase the graphical construction of the company route 14. The computer system 30 can be configured to handle any kind of company route design.

Figure 9:
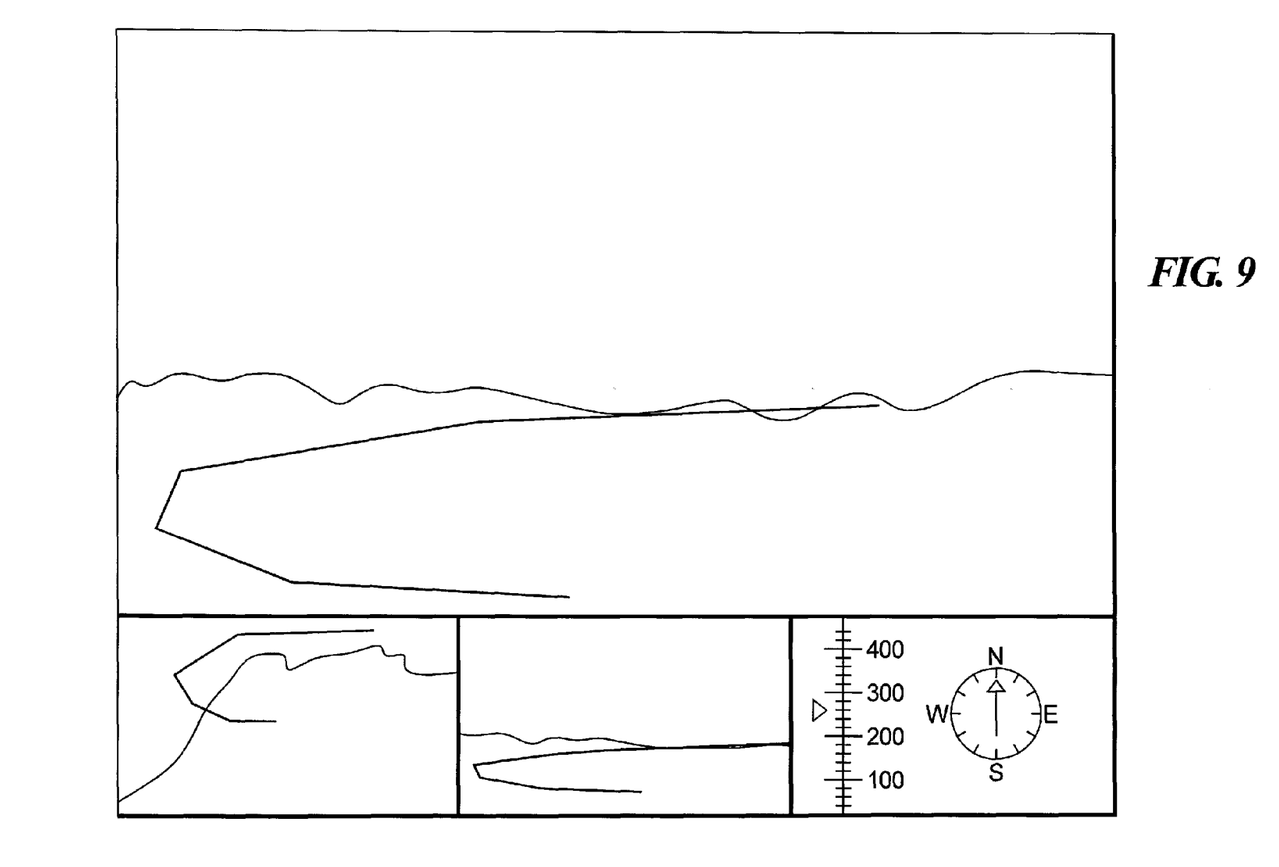

Once full company route is coded, the navigation personnel 10 can virtually fly through the coded path as shown in FIG. 9. This virtual fly through reduces the risk of an incorrect route. If any modification to the data is made, the navigation personnel 10 can again check the changes in the data graphically in real time. The route will be flown virtually to check for validity and correctness. A three dimensional representation of company route provides a better understanding of the designed route and, therefore, reduces the workload of the navigation personnel 10. A three dimensional representation of terrain and obstacle below the planned company route helps the navigation personnel 10 to visualize path position with respect to terrain and obstacles. This representation is an easy way to detect potential company route conflicts with terrain and obstacles, and also to design optimal paths around hazardous areas.

Certain modifications of the present invention have been discussed above. Other modifications of the present invention will occur to those practicing in the art of the present invention. For example, as described above, company routes are designed on the ground by navigation personnel. However, company routes could be designed by navigation personnel is the air or on water.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method for designing a navigational route performed on a computer-implemented navigation system, the method comprising the steps of:
  configuring a geographic area on a visual display of the navigation system, the geographic area being defined by coordinates of latitude and longitude;
  automatically in response to the configuring, fetching from terrain, obstacle, and navigation databases of the navigation system at least:
    a) all available terrain features within the geographic area, b) all available obstacle features within the geographic area, c) all available airports, navigation aids, and airways, and procedures within the geographic area, and displaying elements a) through c) on the visual display of the navigation system;

receiving a selection of an origin airport, the origin airport being displayed within the geographic area, and receiving a selection of a destination airport, and displaying the origin and destination airports on the visual display of the navigation system while simultaneously discontinuing displaying any others of element c);

subsequent to displaying the origin and destination airports, receiving a first selection indicating the choice of a first type of via, said first type of via being one of a fix, an airway, or a procedure;

automatically in response to the receiving the first selection and based on the first selection, displaying on the visual display one of: all fixes within a predetermined radius of the origin airport, all airways passing by the origin airport, or all procedures originating from the origin airport, depending on said selected first type of via;

receiving a second selection indicating the choice of one of the displayed fixes, airways, or procedures that were presented based on the first selection;

displaying the indicated choice of the second selection on the visual display as a first air route path from the origin airport, the first air route path having a beginning at the origin airport and an end at a defined end of the respective fix, airway, or procedure, while simultaneously discontinuing display of others of the fixes, airways, or procedures within the predetermined radius of the origin airport;

subsequent to displaying the indicated choice, receiving a third selection indicating the choice of a second type of via, said second type of via being one of a fix, an airway, or a procedure;

automatically, in response to the receiving the third selection and based on the third selection, displaying on the visual display one of: all fixes within a predetermined radius of the destination airport, all airways passing by the destination airport, or all procedures terminating at the destination airport, depending on said selected second type of via;

receiving a fourth selection indicating the choice of one of the displayed fixes, airways, or procedures that were presented based on the third selection;

displaying the indicated choice of the fourth selection on the visual display as a second air route path to the destination airport, the second air route path having a beginning at a previous fix and an end at the destination airport, while simultaneously discontinuing display of others of the fixes, airways, or procedures within the predetermined radius of the destination airport;

automatically constructing the navigational route as a graphical sequence of the first air route path, any intermediate air route paths, and the second air route path;

automatically rendering the navigational route as a three-dimensional, graphical flyover of the navigational route, wherein the three-dimensional flyover comprises at least all available terrain and obstacles that are overflown by the navigational route, and wherein the three-dimensional flyover comprises a visual display of the navigational route as it progresses from the original airport along the navigational route to the destination airport.

* * * * *